(12) United States Patent
Cooper et al.

(10) Patent No.: US 7,714,776 B2
(45) Date of Patent: May 11, 2010

(54) ANTENNA ARRAY CALIBRATION

(75) Inventors: Timothy S. Cooper, Mouthe (FR); Gerard Baldwin, Dublin (IE); Ronan Farrell, Kilcock (IE)

(73) Assignee: National University of Ireland Maynooth, Maynooth, County Kildare (IE)

( * ) Notice: Subject to any disclaimer, the term of this patent is extended or adjusted under 35 U.S.C. 154(b) by 0 days.

(21) Appl. No.: 12/304,711

(22) PCT Filed: May 18, 2007

(86) PCT No.: PCT/EP2007/004432

§ 371 (c)(1), (2), (4) Date: Dec. 12, 2008

(87) PCT Pub. No.: WO2008/000318

PCT Pub. Date: Jan. 3, 2008

(65) Prior Publication Data

US 2009/0267824 A1   Oct. 29, 2009

(30) Foreign Application Priority Data

Jun. 27, 2006  (IE) .............................. S2006/0482

(51) Int. Cl.
*G01S 7/40* (2006.01)
(52) U.S. Cl. ....................................................... 342/174
(58) Field of Classification Search ................. 342/174, 342/368, 371–377
See application file for complete search history.

(56) References Cited

U.S. PATENT DOCUMENTS 5,657,023 A    8/1997  Lewis et al.
(Continued)

FOREIGN PATENT DOCUMENTS

JP    2003-273634    9/2003
(Continued)

OTHER PUBLICATIONS

International Search Report for PCT/EP2007/004432, mailed Oct. 2, 2007.

*Primary Examiner*—John B Sotomayor
(74) *Attorney, Agent, or Firm*—Withrow & Terranova, P.L.L.C.

(57) ABSTRACT

An antenna array comprises a surface comprising a replicated pattern of conductive tracks, the tracks defining a plurality of ports. A plurality of antennae are located at ports distributed about the surface. A plurality of radiative transceivers are electrically connected to a respective antenna. A plurality of reference transceivers are electrically connected to a non-radiative impedance located at a respective port so that each reference transceiver is surrounded by a group of antennae and electrically coupled to the group of antennae by the tracks. At least one antenna from at least one group of antennae belongs to one other group of antennae. Calibration circuitry includes a controller associated with each reference transceiver, each controller being arranged to transmit a calibration signal through an associated reference transceiver and to receive and store a received calibration signal from a selected transceiver for the group of antennae coupled to the reference transceiver. Each controller is further arranged to receive and store a calibration signal from the selected transceiver for the group of antennae coupled to the reference transceiver. The calibration circuitry further includes for each other transceiver for the group of antenna, circuitry for adjusting the phase and amplitude of signals transmitted and received by the radiative transceivers relative to the stored calibration signals for the selected radiative transceiver.

20 Claims, 9 Drawing Sheets

U.S. PATENT DOCUMENTS

| | | | |
|---|---|---|---|
| 5,943,005 A * | 8/1999 | Tanizaki et al. | 342/175 |
| 6,127,966 A | 10/2000 | Erhage | |
| 6,252,542 B1 * | 6/2001 | Sikina et al. | 342/174 |
| 6,339,399 B1 | 1/2002 | Andersson et al. | |
| 6,515,554 B2 * | 2/2003 | Ishikawa et al. | 333/21 R |
| 7,450,065 B1 * | 11/2008 | Bruce et al. | 342/360 |
| 7,508,343 B1 * | 3/2009 | Maloratsky et al. | 342/374 |
| 2002/0027483 A1 * | 3/2002 | Sasaki et al. | 333/134 |
| 2005/0012658 A1 * | 1/2005 | Eriksson | 342/174 |
| 2005/0122193 A1 * | 6/2005 | An et al. | 333/250 |
| 2008/0007453 A1 * | 1/2008 | Vassilakis et al. | 342/368 |
| 2009/0267824 A1 * | 10/2009 | Cooper et al. | 342/174 |

FOREIGN PATENT DOCUMENTS

| | | |
|---|---|---|
| WO | 2004/025321 A1 | 3/2004 |
| WO | WO 2008000318 A1 * | 1/2008 |

\* cited by examiner

ANTENNA ARRAY CALIBRATION

This application is a 35 U.S.C. 371 national phase application of PCT/EP2007/004432 filed May 18, 2007, which claims the benefit of Irish application S2006/0482 filed Jun. 27, 2006, the disclosures of which are incorporated herein by reference in their entireties.

FIELD OF THE INVENTION

The present invention relates to antenna arrays and in particular a method for calibrating an antenna array.

BACKGROUND OF THE INVENTION

An antenna array comprises a plurality of elements, here, each including an antenna and an associated transceiver. The antennae are arranged in a manner and the transceivers driven such that radiation emanating from the array may be steered electrically. This is known as beamforming.

The difficulty in employing antenna arrays is that, in order avoid beamforming errors, the individual antennae each require stimulation at a correct radio frequency (RF) amplitude and phase. This requires an electrical path between transceivers and antenna elements to be equivalent.

Antenna array calibration is the process by which operation of the antenna elements at the correct amplitude and phase is established. For convenience, we categorise antenna array calibration schemes as either radiative (where the calibration is effected by an RF signal radiated in free space) or wired systems.

Typically, wired calibration schemes use internally generated calibration signals which are routed to an internal transceiver. FIG. 1 illustrates the basic principles of a wired calibration scheme. A transmitter calibration system 10 assumes operation at a single known and accurate frequency and comprises a first transceiver 12, a second transceiver 14 and a reference transceiver 16. Output power from the first transceiver 12 is coupled to the reference transceiver 16, which performs and records an amplitude and phase measurement. Output power from the second transceiver 14 is coupled to the reference transceiver 16, which performs an amplitude and phase measurement. A feedback path 18 is provided between an input of the second transceiver 14 and the reference transceiver 16 by which the amplitude and phase of the second transceiver 14 is modified until the measurement is equal to the recorded measurement of the first transceiver 12.

Thus, accurate amplitude and phase control may be attained provided that a calibration path, Cal Err 1, between the first transceiver 12 and the reference transceiver 16 and a calibration path, Cal Err 2 between the second transceiver 14 and the reference transceiver 16 are equal, i.e. Cal Err 1−Cal Err 2=0.

U.S. Pat. No. 6,339,339 discloses a similar scheme to that of FIG. 1. A common reference transceiver is employed to measure amplitude and phase of distributed antenna element transceivers of an antenna array, and to apply correction factors in order to calibrate transmission of the antenna array.

The drawback associated with wired calibration schemes is that they are impractical for use with large antenna arrays because of the need to connect all of the elements of the array back to a reference transceiver. Thus for large arrays, manual or radiative calibration techniques are often implemented.

Radiative calibration schemes involve the emission of RF energy into free space to ensure accurate element amplitude and phasing.

U.S. Pat. No. 5,657,023 discloses a radiative calibration scheme whereby mutual coupling between array elements is employed to derive an error signal. This involves an interleaved lattice of transceivers, which once phased form an operational antenna.

While practical in simplex systems, for example, radar systems, such a scheme has the disadvantage of requiring complex transceiver hardware in a full duplex communication system.

It is an object of the present invention to mitigate the disadvantages associated with the prior art.

SUMMARY OF THE INVENTION

The present invention provides an antenna array as claimed in claim 1.

The present invention has the advantage that it avoids the complexity of the prior art by employing low-cost, hardwired and easily replicated reference transceivers.

Furthermore, the combination of multi-reference calibration and the exploitation of wired calibration result in increased spectral efficiency.

Thus, the present invention enables the production of spectrally efficient and scalable antenna arrays for use in, for example, mobile phone base stations and the like.

BRIEF DESCRIPTION OF THE DRAWING FIGURES

Embodiments of the invention will now be described, by way of example, with reference to the accompanying drawings, in which.

DETAILED DESCRIPTION OF THE PREFERRED EMBODIMENTS

Figure 1:
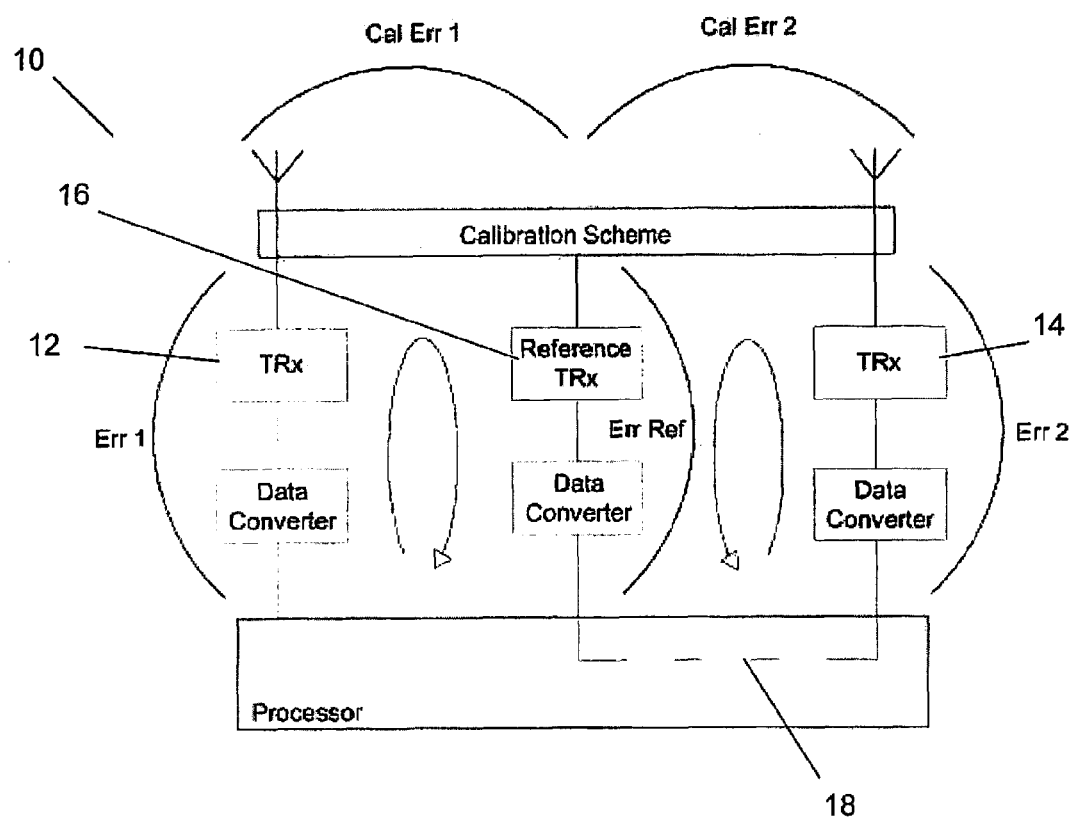
FIG. 1 illustrates a wired calibration system according to the prior art.
Figure 2:
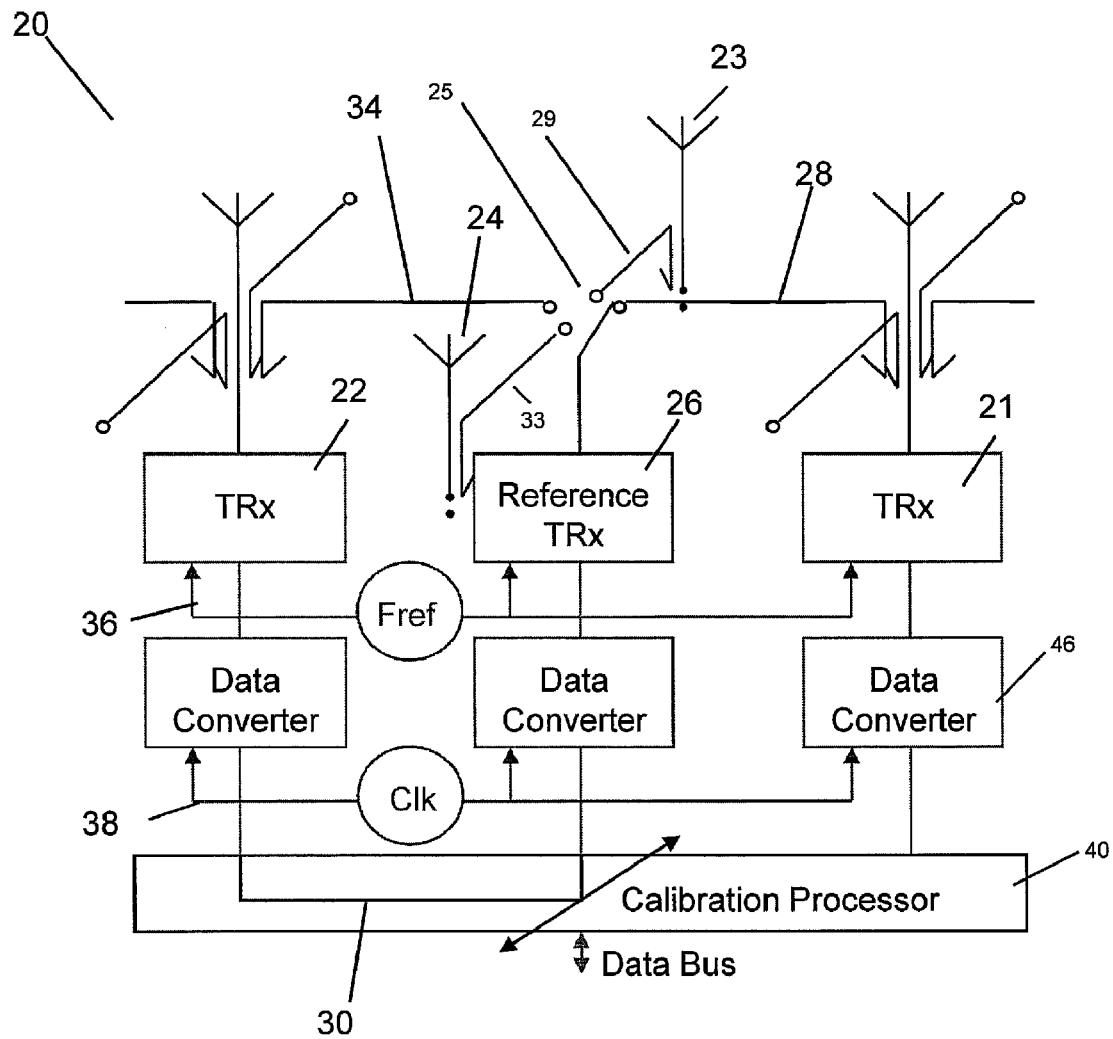
FIG. 2 illustrates schematically a portion of an antenna array including 3 array elements interconnected according to an embodiment of the present invention.

Referring now to FIG. 2, there is depicted a portion 20 of an antenna array according to an embodiment of the present invention.

This portion 20 comprises first and second transceivers and their antenna 21 and 22 and the antennae for third and fourth transceivers 23 and 24, respectively, as well as a dedicated non-radiative reference transceiver 26.

In the preferred embodiment, a coupled electromagnetic calibration path 28 is provided between the first transceiver 21 and the reference transceiver 26. Similarly, a coupled electromagnetic calibration path 34 is provided between the second transceiver 22 and the reference transceiver 26.

In addition, a feedback path 30, is provided between the second, third and fourth transceivers 22, 23 and 24 and the reference transceiver 26. To ensure all of the elements of the array are frequency coherent, a single signal generator signal (Fref) is distributed through a network 36 between all of the array transceivers. This signal drives frequency conversion elements, described in more detail later, within each transceiver. Likewise, a second distribution network 38 for digital timing, using a single digital clock (Clk) is employed. Distribution networks 36, 38 are only shown with reference to the transceivers 21, 22 and 26, however, it will be appreciated that these extend (not shown) to provide frequency generator (Fref) and clocks (Clk) to the third and fourth transceivers 23, 24. These distribution networks ensure that the array may be accurately calibrated, as otherwise a frequency or timing error will influence the calibration accuracy. It is important to note that the lengths of paths within the networks 36, 38 is not critical, thus simplifying their production.

Similarly, a coupled electromagnetic calibration path 29 is provided between the third transceiver 23 and the reference transceiver 26, and a coupled electromagnetic calibration path 33 is provided between the fourth transceiver 24 and the reference transceiver 26.

In the preferred embodiment, the calibration paths 28, 29, 33 and 34 each comprise a non-radiative coupled RF path. The calibration paths can, however, be any non-radiative divided, switched or coupled RF path or any other suitable feedback path. Furthermore, it will be appreciated that feedback path can operate at any RF frequency including microwave.

In FIG. 2, the reference transceiver 26 is shown as being selectively connected to one of the four coupled electromagnetic calibration paths 28, 29, 33, 34, by a switch 25. By altering the state of the switch 25, the reference transceiver 26 is then connected to the coupled electromagnetic path 34, so that when, say calibration path 28 is selected, the reference transceiver 26 receives, measures and stores the signal (not shown) from the first transceiver 21. In the preferred embodiment of the invention, a directional coupler is used (see FIGS. 5, 6&8). So for example, in the case of transmit calibration, the reference transceiver 26 receives a signal (not shown) from the second transceiver 22 via the coupled electromagnetic path 34. An error signal (not shown), is generated by the reference transceiver 26 and represents the phase and amplitude difference between the signal received from transceiver 21 and transceiver 22. This error signal is fed back through 30 to alter the amplitude and phase of a baseband signal transmitted by the transmitter portion of the transceiver 22.

In this way, the phase and amplitude of the second transceiver 22 of the antenna array 20, can be matched to the phase and amplitude of the first transceiver 21 of the antenna array 20, via the reference transceiver 26.

Similarly, the third and fourth transceivers 23, and 24, are calibrated with respect to the reference transceiver 26.

Figure 3:
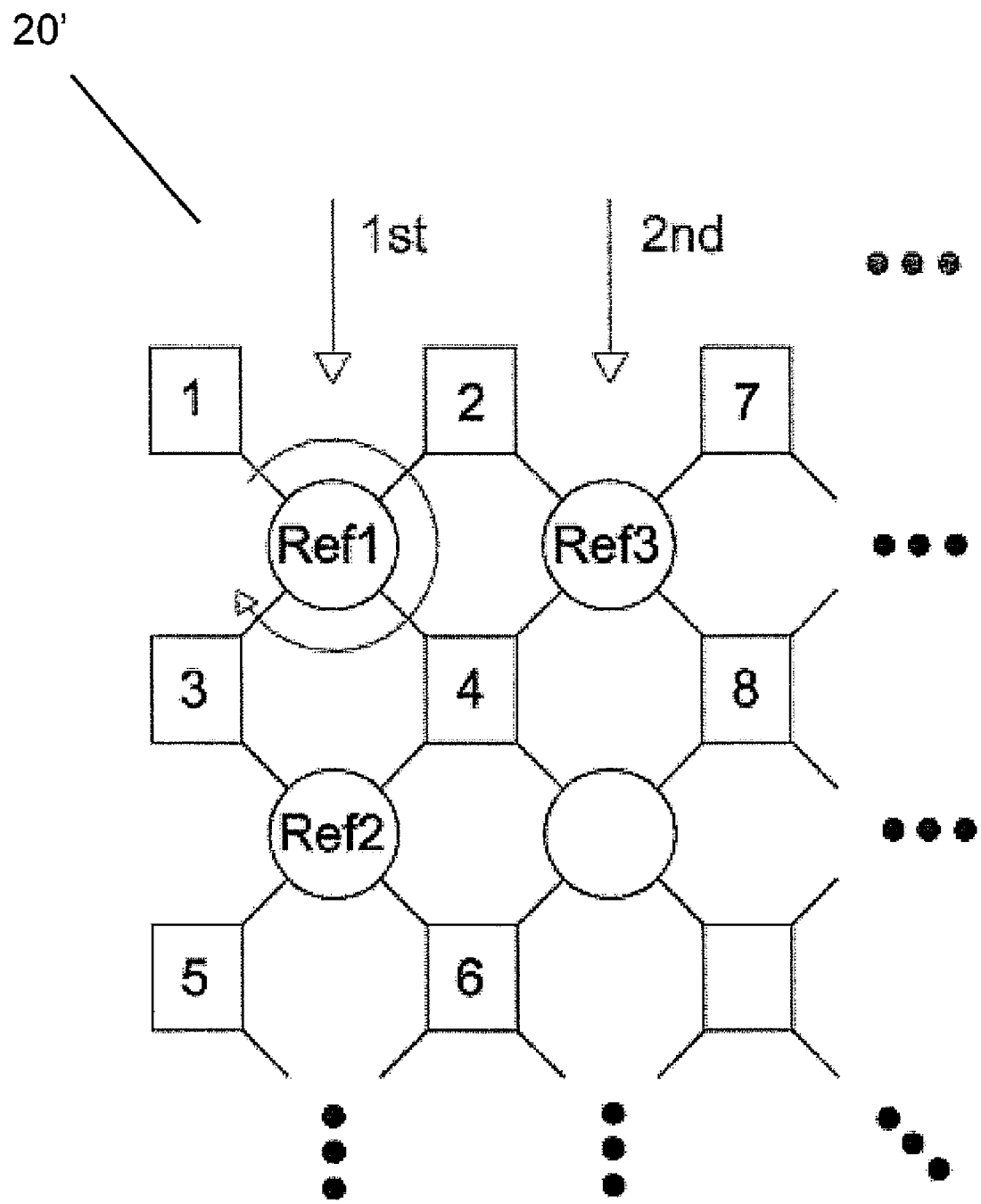
FIG. 3 shows one example calibration path through an array comprising elements of FIG. 2.

Referring now to FIG. 3, there is illustrated a more complete antenna array 20' including a plurality of replicated portions 20 as described in FIG. 2. In this array, each reference transceiver Ref1, Ref2, Ref3 corresponds to a transceiver 26 of FIG. 2. The reference transceivers Ref1, Ref2, Ref3 are interconnected so that they operate their calibration in sequence beginning with a first transceiver, in this case Ref1.

The reference transceiver, Ref1, is calibrated with respect to a first transceiver, 1—which corresponds, for example, with 21 in FIG. 2. Transceivers 2, 3 and 4 are then calibrated in turn with respect to the reference transceiver, Ref1 as described for 22, 23 and 24 of FIG. 2 above.

Reference transceiver Ref2 is then calibrated from newly calibrated transceiver 3, again corresponding to transceiver 21 of FIG. 2. Reference transceiver Ref2 is then used to calibrate fourth, fifth and sixth transceivers 4, 5, and 6. Similarly, reference transceiver Ref3 is calibrated from newly calibrated transceiver 2. Reference transceiver Ref3 is then used to calibrate fourth, seventh and eight transceivers 4, 7, and 8.

This array calibration process is continued throughout the array 20' ensuring accurate amplitude and phasing of the array. This process is repeated across the extent of the array thus allowing the whole array to be calibrated and re-calibrated when required to for example negate the deleterious short term effects of instability due to heating and long term effects of drift of component values, for example, due to ageing.

Figure 5A:
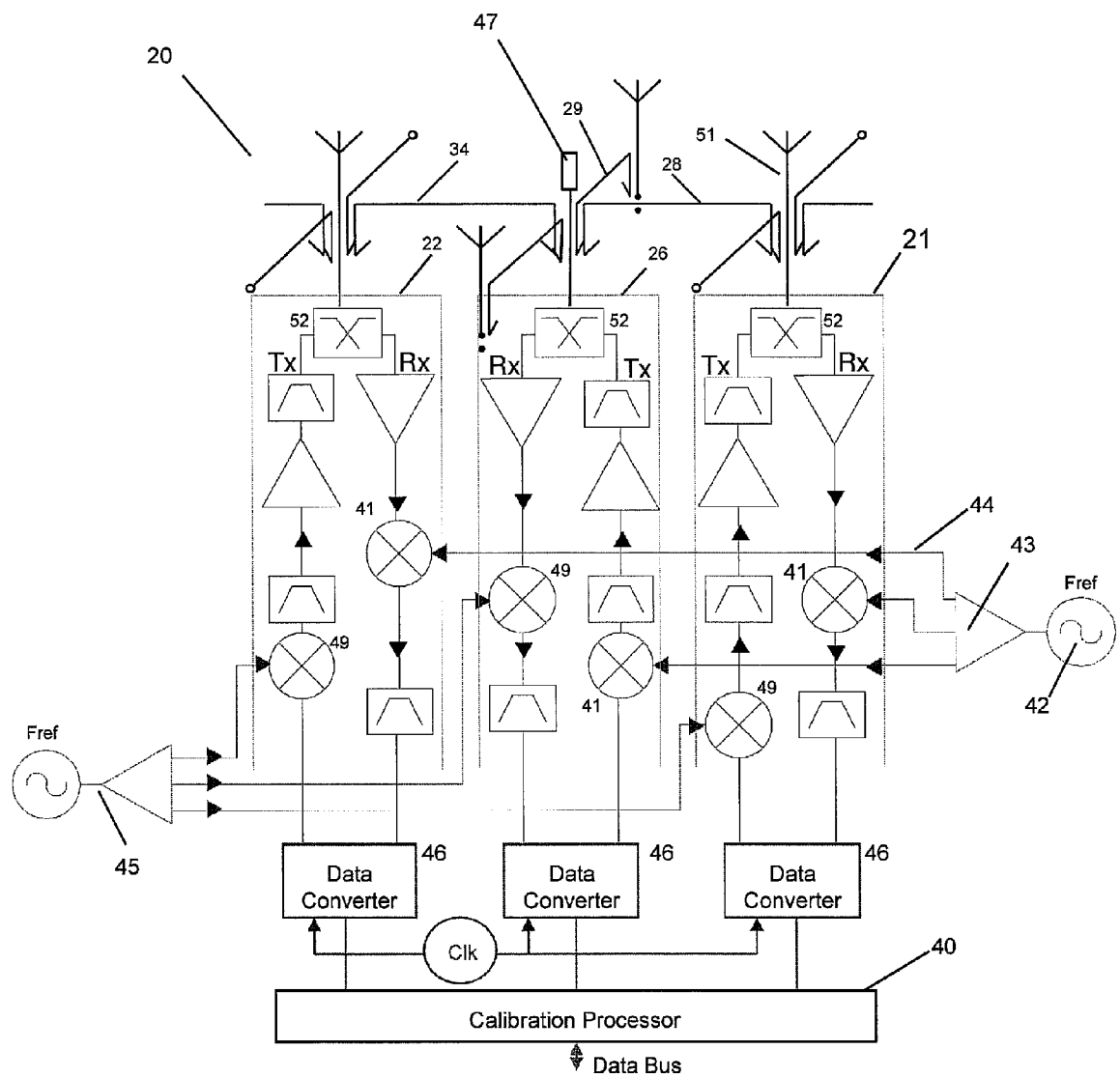
FIG. 5a shows a frequency calibration portion of the array according to the invention in more detail.

An exemplary implementation of the electronics of the array 20' with additional detail illustrating frequency distribution for the calibration scheme is shown in FIG. 5*a*. Here, the calibration scheme enables static beamforming, i.e. a single main lobe output from the array pointing in a pre-defined direction. Although with minor modification, the scheme could be used for dynamic beamforming wherein the radiation from the array may be steered.

Whilst any conceivable transceiver architecture may be employed, this embodiment of the calibration scheme comprises multiple reference and radiative, direct conversion transceiver elements. The supporting transceiver electronics for two radiative elements 21 and 22 are shown along with that for one of the non-radiative reference elements 26 whose purpose is calibration signal generation and measurement. Each radiative element 21, 22 has an antenna element 51 whereas the reference element 26 has its antenna port terminated in a matched impedance 47.

Each transceiver 21-24 includes a frequency conversion element 41 fed by the signal Fref via a divider 43 and its associated distribution sub-network 44. Although a single source for Fref can be employed, in this specific embodiment a second source 45, distribution sub-network 45 and set of frequency conversion elements 49 are employed for the transmit chain.

In this example, calibration processor 40 along with the associated digital baseband processing system, are implemented within an FPGA.

In more detail, each transceiver 21-24 and 26 comprises a diplexer 52 essentially dividing the spectrum into transmit and receive bands. Note that for the reference transceiver 26 the diplexer is reversed so that its receive band corresponds with the transmit bands of the other transceivers 21-24 and vice versa.

For the transceivers 21-24, data supplied by the converters 46 which are clocked from the common clock Clk is mixed with the signal Fref in conversion elements 49 before being pre-filtered, amplified, further filtered and fed to an antenna 51. In the receive paths of the transceivers, data is amplified, de-modulated with signal Fref, and filtered before being received by data converters 46.

In the case of the reference transceiver 26, the modulated signal is fed or received along the calibration paths 28, 29, 33, 34 for reception or when transmitted by an adjacent coupled transceiver 21-24.

Figure 5B:
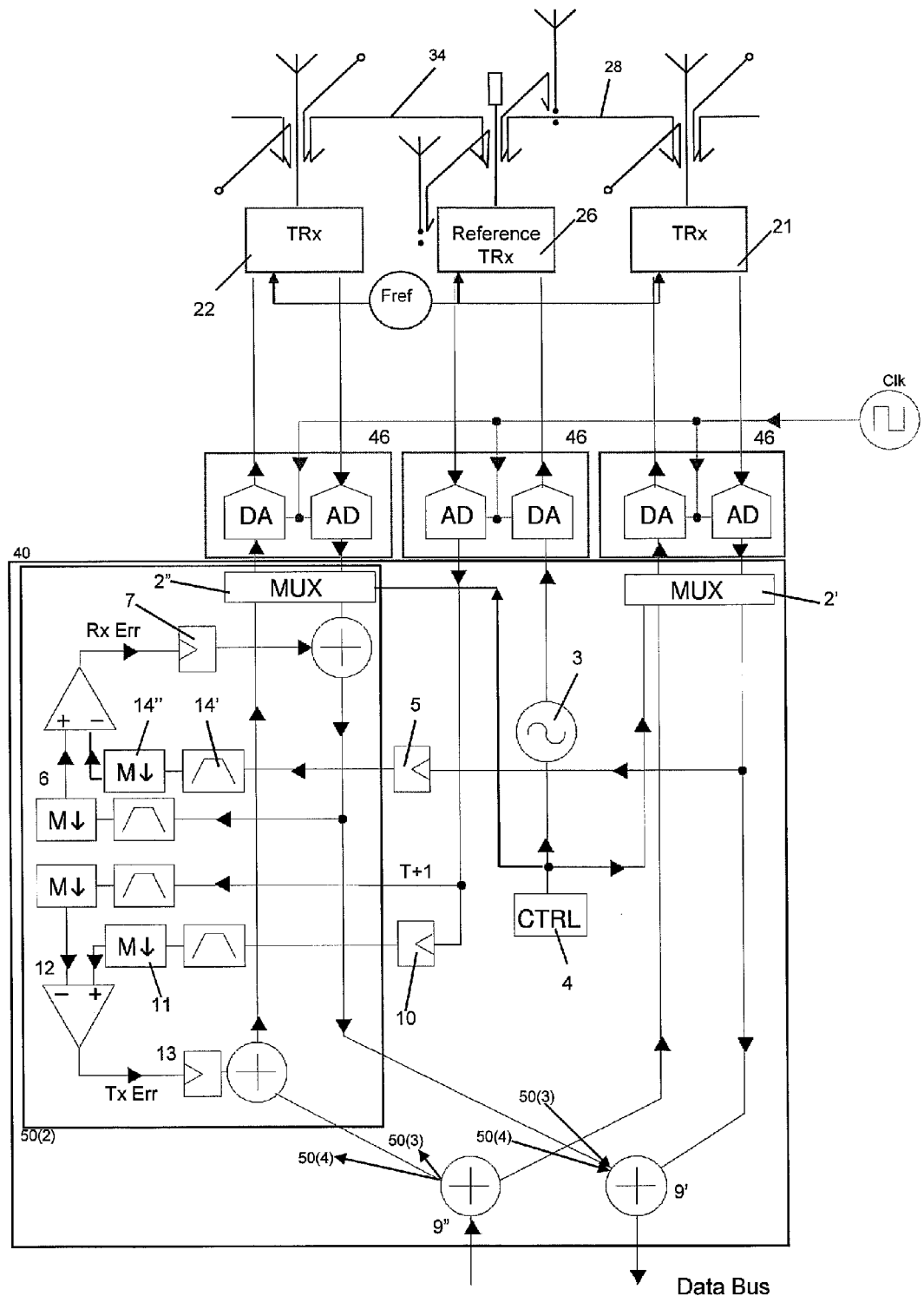
FIG. 5b shows a calibration processor portion of the array of FIG. 5a in more detail.

FIG. 5*b* illustrates the operation of the calibration processor 40 and data converters 46 in more detail. Here the common timing signal Clk is shown driving the analog-to-digital (AD) and digital-to-analog (DA) components of the data converters 46.

In this embodiment, mutual coupling is calculated and corrective amplitude and phase weightings are applied via additive feedback to the calibration error signal, thereby compensating for the mutual coupling error.

For each reference transceiver 26, the calibration processor includes a controller 4 which selectively controls a signal generator 3 to produce reference signals at frequencies for which the array elements are to be calibrated. The signal generator 3 is in turn connected to the DA port of the reference transceiver data converter 46. Controllers for each reference transceiver are interconnected (not shown) to properly configure their surrounding transceivers 21-24 in sequence both relative to the transceivers surrounding a given reference transceiver and also across the entire array.

The data converter 46 for the transceiver selected as a first transceiver 21 is connected via a multiplexer 2' controlled by the controller 4 to the data bus. In the present embodiment, a calibration circuitry module 50(2) . . . 50(4) is duplicated for each of the second to fourth transceivers respectively surrounding a reference transceiver. Each calibration circuitry module includes a further multiplexer 2" for selective connection of a module 50 to any of the second to fourth transceivers 22-24. Thus, calibration may be performed relative to any selected first transceiver on the 3 other transceivers surrounding a single reference transceiver. This means that there can be arbitrary selection of the first transceiver element 21 and thereafter calibration of the remaining transceivers. It will be seen that the architecture of FIG. 5b, allows for the simultaneous calibration of transmit and receive paths.

For the receiver portions of the array transceivers to be accurately calibrated, a signal is generated 3 orthogonal (in this case in frequency, but code or temporal orthogonality, for example, is also viable) to those normally in use by the communication uplink. The calibration controller 4 determines the frequency to be used. The calibration signal is listened for at first transceiver element 21 (as selected through the multiplexer 2') through calibration path 28. A suitably long sample containing the signal is stored 5 for the first transceiver 21. When the stored signal from the first transceiver 21 is re-generated, discrimination between the wanted calibration and unwanted communications traffic is made by filtering the signal with a tuneable channel select filter 14' and decimating 14" the filtered signal to reduce the calibration routine's processing requirements. The signal received by the reference transceiver 22 and fed through its calibration circuitry module 50(2) is received, processed in a similar manner to the reference signal received by the first transceiver element 21 and compared both in amplitude and phase with the re-generated signal from the first element 21. The difference between the two is used to generate a digital baseband error signal (Rx Err) which may then be stored 7 and subsequently applied to the receive signal for the transceiver 22 to ensure accurate phase and amplitude between the received signals from the two elements. The calibration error signal is stored between calibration runs 7 to ensure that only valid error signals influence the received signal. This process is repeated for the two adjacent receivers 23, 24. Calibrated received signals from the first to fourth transceivers surrounding the shown reference transceiver are added 9' together as well as to the received signals for the remaining transceivers of the array as required once all transceivers have been calibrated for the required frequencies.

By reciprocity, transmit calibration is the reverse of receive calibration, the principle differences being that, the transmit signal itself may be used (with minor modification) as a calibration signal source 9" and that simultaneous calibration of multiple transceiver elements, which share a reference transceiver 26, is not possible.

In more detail, the transmit signal 9" coupled to the array is transmitted through the first transceiver 21 and received by the reference element 26 through the selected calibration path 28 and stored 10. When re-generated, this signal is then filtered and decimated 11.

Subsequently at T+1, a signal transmitted by transceiver element 22 and received by the reference transceiver 26 through calibration path 34 once filtered and decimated can be compared 12 with the re-generated and similarly processed reference signal from the first transceiver 21. The error signal Tx Err for this frequency generated by this comparison is then stored 13 and applied to the baseband signal 9", thus eliminating the phase and amplitude imbalance between the pair of radiative elements 21, 22. This process is then repeated for the other elements 23, 24 surrounding the shared reference element 26.

The above description provides a frequency orthogonal calibration scheme which allows calibration during operation of the array with negligible effect on the array's capacity as a communication link.

Using the preferred embodiment, optimal calibration performance may be achieved by subsequent selection of other reference transceivers (different calibration paths), averaging or annealing techniques.

Figure 6:
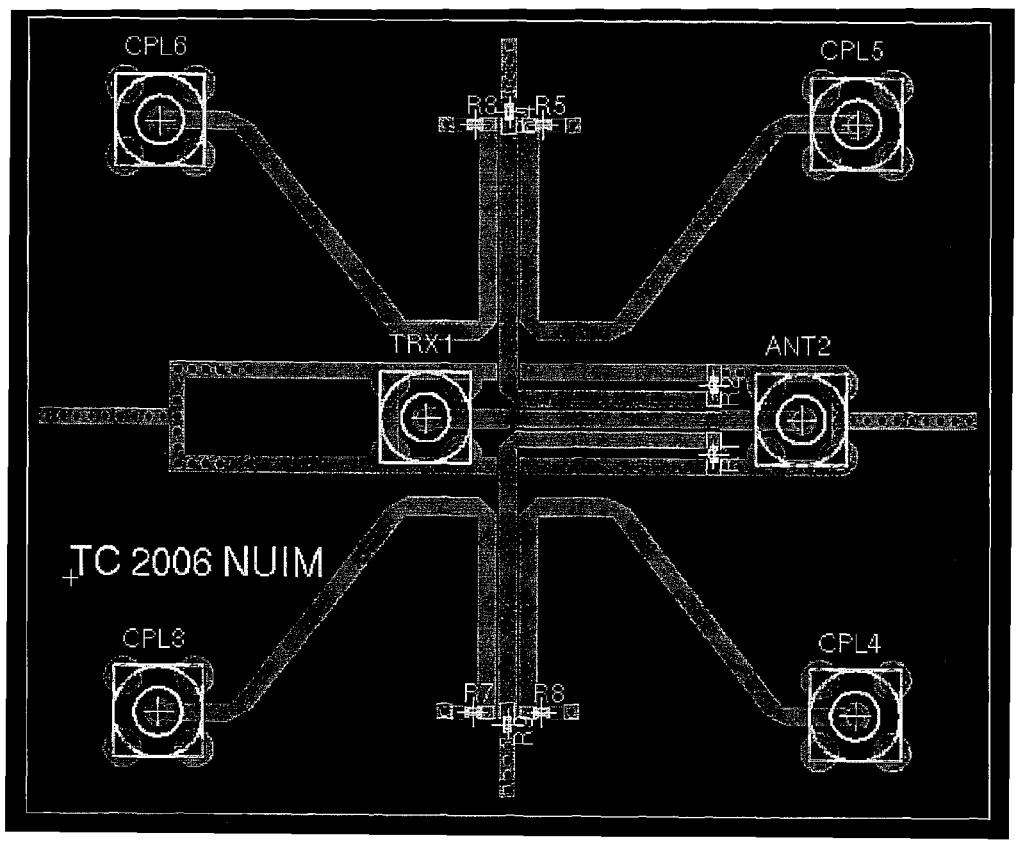
FIG. 6 shows a six port EM coupler element for use in the preferred embodiment of the invention.
Figure 8:
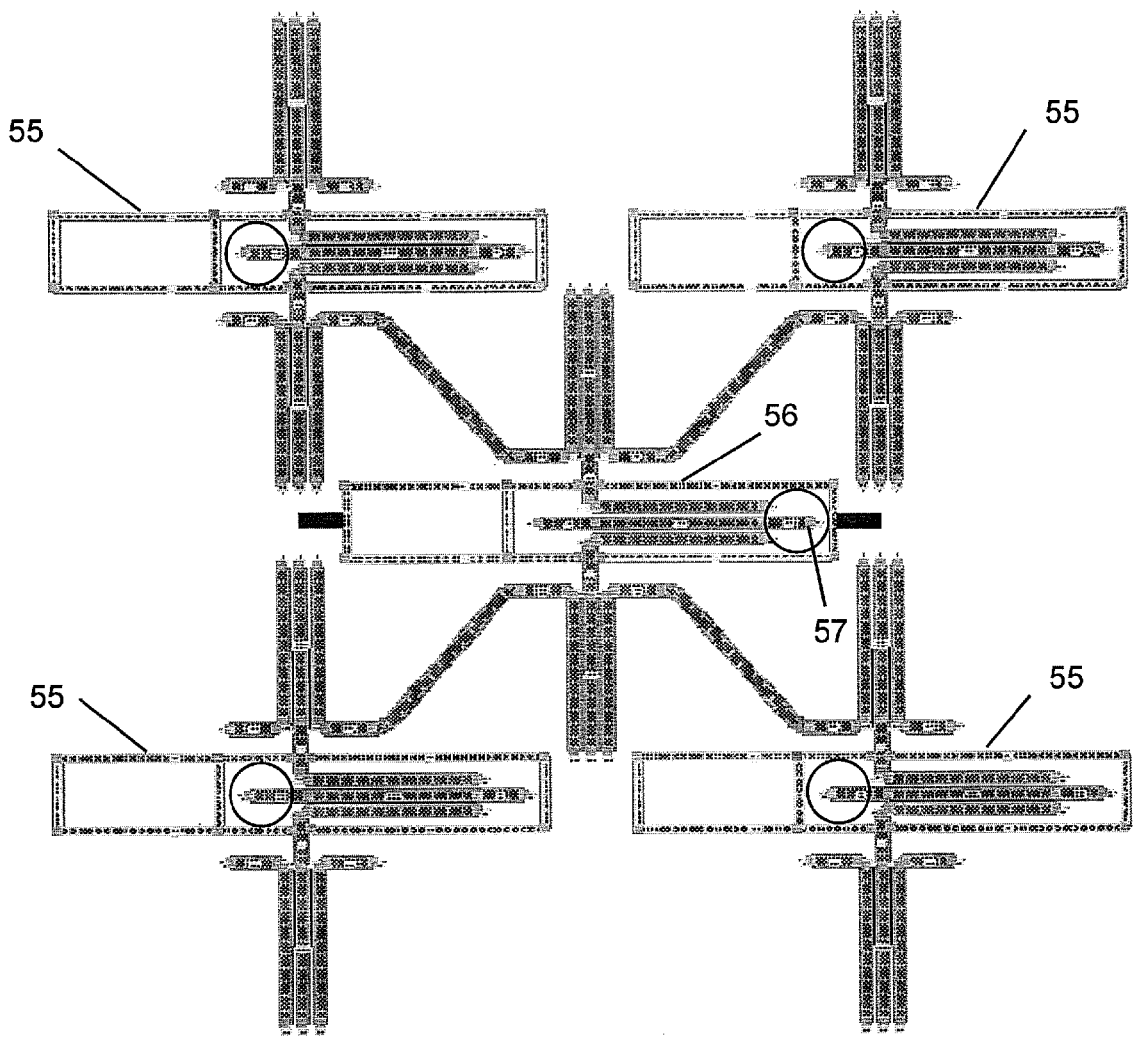
FIG. 8 shows a circuit layout for a portion of the antenna array in which the EM coupler element of FIG. 6 is replicated.

In the preferred embodiment, the surface of the antenna array is implemented with electromagnetic band-gap (EBG) structures including planar micro-strip line antenna structures in order to improve directionality and help mitigate mutual coupling. FIG. 6 shows the physical embodiment of the internal surface of a single array element coupler implemented in strip-line (i.e. this structure is sandwiched between two layers of conductive sheet, one of which forms the ground plane of the antenna). Here an I/O port for transceivers 21-24 is connected to port TRX1 whilst the corresponding antenna 51 is connected to port ANT2. In the case of a reference transceiver 26, the matching impedance 47 is connected to port ANT2. Mounted between terminals R1-R9 are matching impedances for reducing reflectance. Translating and replicating this pattern from TRX1 each of ports CPL3-6 allows an entire antenna array surface of a required size to be defined. FIG. 8 shows how this pattern is replicated for multiple couplers to form a scalable structure for an array to be calibrated as described with reference to FIGS. 2-5. Here four radiative transceiver elements 21-24 are connected to respective couplers 55 and these are in turn connected to one central reference transceiver 26 via coupler 56, port 57 of which, is terminated in a matched impedance (not shown) as described previously. Thus, the interconnection of four single couplers to a single central coupler for the reference transceiver 26 forms the basic unit of the antenna array.

Figure 4:
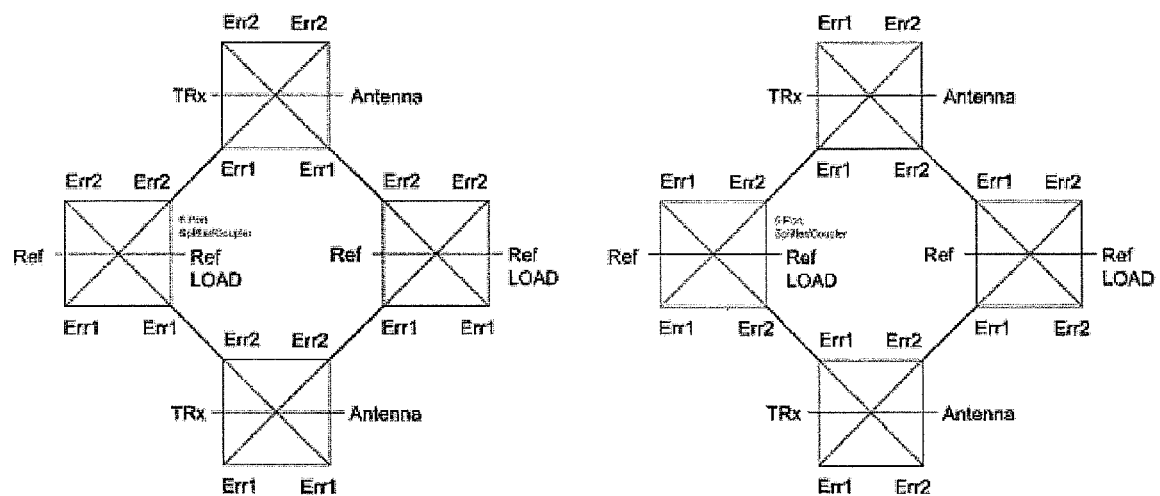
FIG. 4 shows an arrangement of array elements according to the present invention indicating a mitigation of the effects of path imbalance.

It will be seen from FIG. 6 that the arrangement of individual couplers is not symmetrical and it might be thought that this and other sources of path imbalance may cause a propagation of error through the array. However, FIG. 4 shows how phase and amplitude imbalance (Err 1+Err2) through each element of the calibration scheme through either axis is nearly identical. Thus, using the present scheme, accuracy of the amplitude and phase balance of the array is increased by distributing the error as indicated, because of the geometry of the calibration paths, a substantial portion of the error is cancelled, thus improving the overall calibration accuracy of the array.

Figure 7:
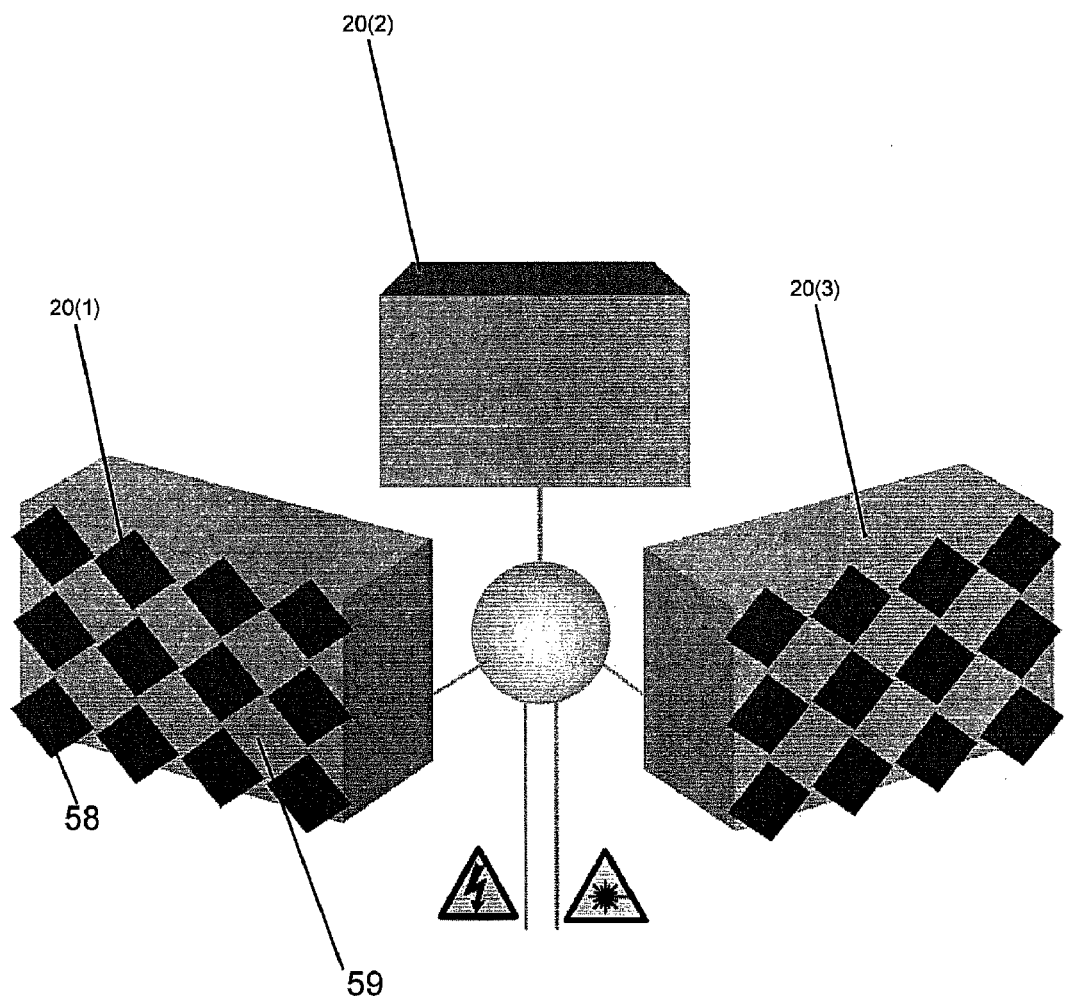
FIG. 7 shows a tower top comprising a plurality of antenna arrays according to the present invention.

FIG. 7 illustrates a plurality of antenna arrays 20(1), 20(2), 20(3) calibrated using the present invention, deployed at a tower-top. In this implementation, the calibration process is completely self-contained. Radiative antenna elements (example 58) are calibrated by reference elements (example 59) to form a working communication link. Data is transferred from tower-top to tower-bottom by fibre-optic cable, thus negating the need for coaxial feeder cables.

It will be seen that the present invention is not limited to calibrating telecommunications antenna arrays. The present invention may equally be employed in medical imaging, radar or similar EM imaging techniques.

The present invention is not limited to the embodiments described herein, which may be amended or modified without departing from the scope of the present invention.

The invention claimed is:

1. An antenna array comprising:
    a surface comprising a replicated pattern of conductive tracks, said tracks defining a plurality of ports,
    a plurality of radiative antennae, said antennae being located at ports distributed about said surface,
    a plurality of receiver, each receiver including a respective antenna;
    a plurality of reference transmitter paths, each transmitter path including a non-radiative impedance located at a respective port so that each reference transmitter is surrounded by a group of receivers and electrically coupled to said group of receiver antennae by said tracks, at least one antenna from at least one group of receivers belonging to one other group of receivers; and
    calibration circuitry including a controller associated with each reference transmitter, each said controller being arranged to transmit a calibration signal through an associated reference transmitter and to receive and store a received calibration signal from a selected receiver for said group of receivers coupled to said reference transmitter; each said controller being further arranged to receive and store a calibration signal from said selected receiver for said group of receivers coupled to said reference transmitter, said calibration circuitry farther including for each other receiver for said group of receivers, circuitry for adjusting the phase and amplitude of signals received by said receivers relative to said stored calibration signals for said selected receiver.

2. An antenna array according to claim 1 wherein each of said receivers and said transmitters comprises a transceiver.

3. An antenna array according to claim 2 wherein each of said controllers are interconnected and programmed to calibrate their associated group of transceivers in sequence.

4. An antenna array according to claim 2 in which each of said reference transceivers and their associated group of transceivers includes a diplexer having first and second I/O ports and a port for connection to one of an antenna or a non-radiative impedance, said first I/O ports for said reference transceivers having a pass band corresponding to a pass band of the second I/O port for their associated group of transceivers and vice versa.

5. An antenna array according to claim 4 including first a common frequency source for driving each of the first I/O ports for said reference transceivers and the second I/O ports for their associated group of transceivers.

6. An antenna array according to claim 4 including a second common frequency source for driving each of the second I/O ports for said reference transceivers and the first I/O ports for their associated group of transceivers.

7. An antenna array according to claim 2 wherein the adjusted received signals for group of transceivers and signals received from said selected transceivers are summed to provide an antenna output.

8. An antenna array according to claim 2 in which each of said reference transceivers and their associated group of transceivers is connected to a respective data converter.

9. An antenna array according to claim 8 wherein each of said data converters is driven from a common clock.

10. An antenna array according to claim 8 wherein signals received from data converters are adjusted before being summed.

11. An antenna array according to claim 10 wherein said array is arranged to communicate with a common data source by a fibre optic link.

12. An antenna array according to claim 3 wherein data supplied to said antenna array is split before being adjusted for the associated group of transceivers and for said selected transceivers.

13. An antenna array according to claim 2 wherein said phase and amplitude are adjusted to provide a static beam.

14. An antenna array according to claim 2 wherein said phase and amplitude are adjusted to provide a dynamically steered beam.

15. An antenna array according to claim 2 wherein said surface comprises planar micro-strip line antenna structures located at said ports.

16. An antenna array according to claim 1 wherein each non-radiative impedance is surrounded by their associated group of radiative antennae.

17. An antenna array according to claim 1 in which said calibration circuitry is arranged to generate said calibration signal.

18. An antenna array comprising:
    a surface comprising a replicated pattern of conductive tracks, said tracks defining a plurality of ports,
    a plurality of radiative antennae, said antennae being located at ports distributed about said surface,
    a plurality of transmitters, each transmitter including a respective antenna;
    a plurality of reference receiver paths, each receiver path including a non-radiative impedance located at a respective port so that each reference receiver is surrounded by a group of transmitters and electrically coupled to said group of transmitter antennae by said tracks, at least one antenna from at least one group of transmitters belonging to one other group of transmitters; and
    calibration circuitry including a controller associated with each reference receiver, each said controller being arranged to receive a calibration signal through an associated reference receiver and to store said received calibration signal from a selected transmitter for said group of transmitters coupled to said reference receiver; each said controller being further arranged to transmit a calibration signal from said selected transmitter for said group of transmitters coupled to said reference receiver, said calibration circuitry further including for each other transmitter for said group of transmitters, circuitry for adjusting the phase and amplitude of signals transmitted by said transmitter relative to said stored calibration signals for said selected transmitter.

19. An antenna array according to claim 18 wherein each non-radiative impedance is surrounded by their associated group of radiative antennae.

20. An antenna array according to claim 18 in which said calibration circuitry is arranged to generate said calibration signal.

* * * * *

UNITED STATES PATENT AND TRADEMARK OFFICE
CERTIFICATE OF CORRECTION

PATENT NO. : 7,714,776 B2
APPLICATION NO. : 12/304711
DATED : May 11, 2010
INVENTOR(S) : Cooper et al.

It is certified that error appears in the above-identified patent and that said Letters Patent is hereby corrected as shown below:

In column 8, at line 9 claim 11, please change "according to claim 3" to --according to claim 2--

Signed and Sealed this
Twenty-eighth Day of December, 2010

David J. Kappos
*Director of the United States Patent and Trademark Office*